United States Patent [19]

Scarano

[11] Patent Number: 5,118,421
[45] Date of Patent: Jun. 2, 1992

[54] CYLNDRICAL FILTER MEDIA WITH SUPPORT STRUCTURE

[75] Inventor: Robert V. Scarano, Glen Falls, N.Y.

[73] Assignee: Albany International Corp., Albany, N.Y.

[21] Appl. No.: 715,044

[22] Filed: Jun. 12, 1991

Related U.S. Application Data

[63] Continuation of Ser. No. 398,056, Aug. 24, 1989, abandoned.

[51] Int. Cl.⁵ .............................................. B01D 29/03
[52] U.S. Cl. ..................................... 210/485; 210/495; 210/499
[58] Field of Search ................. 55/378, 379, 494, 495, 55/498; 210/484, 485, 497.01, 497.1, 499

[56] References Cited

U.S. PATENT DOCUMENTS

| | | |
|---|---|---|
| Re. 18,968 | 10/1933 | Willers . |
| 785,182 | 7/1904 | King . |
| 1,858,592 | 5/1932 | Johnson . |
| 2,160,790 | 5/1939 | Swanson . |
| 2,284,787 | 6/1942 | Winkler . |
| 2,314,477 | 3/1943 | Bodey .................. 210/497.01 X |
| 2,323,713 | 7/1943 | Harmon . |
| 2,729,294 | 1/1956 | Adams . |
| 3,034,656 | 5/1962 | Kasten . |
| 3,584,685 | 6/1971 | Boyd . |
| 3,815,333 | 6/1974 | Rhodes ................................ 55/378 X |
| 3,853,509 | 12/1974 | Leliaert ................................ 55/378 X |
| 3,874,857 | 4/1975 | Hunt et al. ........................... 55/379 X |
| 3,958,634 | 5/1976 | Smith, III . |
| 3,975,274 | 8/1976 | Nommensen . |
| 4,141,128 | 2/1979 | Wonderling ....................... 55/379 X |
| 4,269,613 | 5/1981 | Miko et al. ......................... 55/492 X |
| 4,358,371 | 11/1982 | Jameson et al. ................. 210/485 X |
| 4,365,669 | 12/1982 | Wagner et al. . |
| 4,378,294 | 3/1983 | Wagner et al. . |
| 4,381,820 | 5/1983 | Wagner . |
| 4,402,830 | 9/1983 | Pall . |
| 4,421,646 | 12/1983 | Correge et al. . |
| 4,428,423 | 1/1984 | Koehler et al. . |
| 4,494,603 | 1/1985 | Harguindey . |
| 4,504,288 | 3/1985 | Kreft ................................... 55/379 X |
| 4,569,763 | 2/1986 | Arai . |
| 4,657,079 | 4/1987 | Nagaoka ............................ 166/231 |
| 4,742,872 | 5/1988 | Geske . |
| 4,838,903 | 6/1989 | Thomaides et al. ............ 55/498 X |

*Primary Examiner*—Charles Hart
*Attorney, Agent, or Firm*—Kane, Dalsimer, Sullivan, Kurucz, Levy, Eisele & Richard

[57] ABSTRACT

A tubular or cylindrical filter structure consists of a plurality of ring-shaped elements disposed in stacked relation by connecting rods and supporting a filtering media. The filtering media is disposed inside or outside the ring-shaped elements, depending on the direction of fluid flow therethrough. The ring-shaped elements protect the filtering media from tensile or compressive forces generated by the fluid flow, and at the same time present an open structure.

19 Claims, 2 Drawing Sheets

CYLNDRICAL FILTER MEDIA WITH SUPPORT STRUCTURE

This is a continuation of co-pending application Ser. No. 398,056 filed on Aug. 24, 1989, now abandoned.

BACKGROUND OF THE INVENTION a. Field of Invention

This invention pertains to a filter used for removing particulate matter from a fluid under high pressure, and more particularly to a filter structure having a tubular or cylindrical configuration.

b. Description of the Prior Art

In many industrial processes, a cylindrical filter is required for separating particulate matter from a fluid, said fluid flowing in a radial direction either inwardly or outwardly with respect to a filtering media. Prior art cylindrical filters used for radially outward flow usually included a cylindrical plate formed with a plurality of perforations and a filtering media disposed within the cylinder in the flow path of the fluid. However this type of structure was found to be unsatisfactory for a number of reasons. For example, the perforations had to be spaced sufficiently to insure that the filter structure could withstand the radial forces and consequential hoop stress applied thereto by the high pressure fluid during filtration. However, as a result of this spacing, a large filter was required to be able to handle a given fluid flow. Perforating the plate meant that at least 50% of the plate materials were discarded. Furthermore, at least 50%-60% of the filtering media was blocked. A more open structure could be made only by providing a very thick plate for withstanding the above-mentioned radial forces. Hence the cylindrical filters used in the industry up till now were inefficient and expensive.

OBJECTIVES AND SUMMARY OF THE INVENTION

In view of the above mentioned disadvantages, it is an objective of the present invention to provide a cylindrical filter with an open structure to take full advantage of the surface area of a filtering media.

A further objective is to provide a filter structure having small overall dimensions.

Yet another objective is to provide a filter structure in with a filter medium having very small interstices for capturing minute particulate matter.

Other objectives and advantages of the invention shall become apparent from the following description. Briefly, a filter structure constructed in accordance with this invention comprises a plurality of ring-shaped elements arranged to define a cylindrical space. The ring shaped elements are preferably made of a flat material arranged to extend radially from said space. The structure also includes a plurality of reinforcing rods extending axially and connected to the ring-shaped elements. A filtering medium is disposed and arranged for support by said ring-shaped elements.

DETAILED DESCRIPTION OF THE INVENTION

Figure 1:
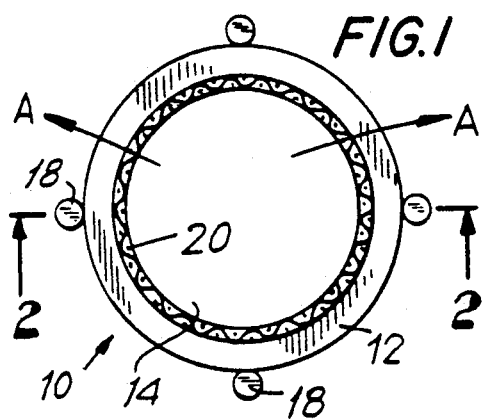
FIG. 1 discloses a plan view of a filter structure constructed in accordance with this invention.
Figure 2:
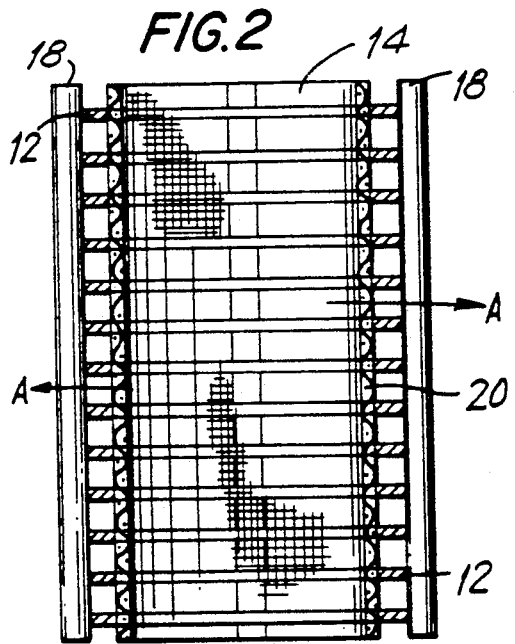
FIG. 2 shows a side-sectional view of the structure of FIG. 1.
Figure 7:
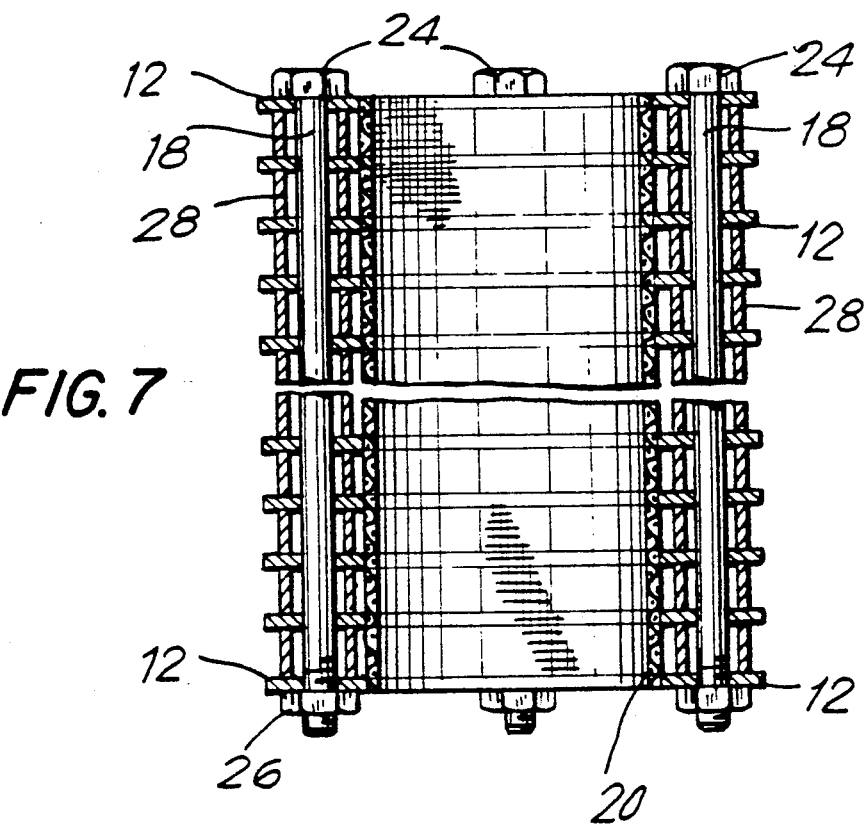
FIG. 7 shows an alternative embodiment for the filter structure of FIG. 1.

Referring now to FIGS. 1 and 2, a filter structure 10 constructed in accordance with this invention includes a plurality of ring-shaped members 12 aligned to form a substantially cylindrical space 14. The ring-shaped members are preferably made of a relatively flat material so that they extend radially outwardly from the cylindrical space 14. A plurality of rods 18 are disposed circumferentially around the ring shaped members 12 to maintain the axial distance and to position the rings. The ring-shaped members are made of a strong material such as a metal ribbon. The rods 18 are also preferably made of a metallic material and are secured to the ring shaped elements 12 by well-known means such as by welding. Alternatively, the rods 18 pass through holes made in the ring-shaped members and are provided with a head 24 at one end and a nut 26 screwed on the other end as shown in FIG. 7. In this configuration, the spacing between the ring-shaped elements are maintained by spacer cylinders 28 as shown.

The filter structure 10 also includes a filtering media 20 having a cylindrical shape and disposed inside ring-shaped members 12 for support. The media 20 has a plurality of interstices which allow a fluid to flow outwardly from space 14 as shown in the FIGS. by arrows A.

Figure 3:
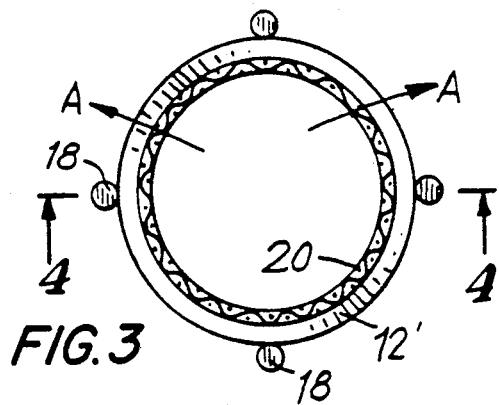
FIG. 3 discloses a plan view of an alternate embodiment of a filter structure constructed in accordance with this invention.
Figure 4:
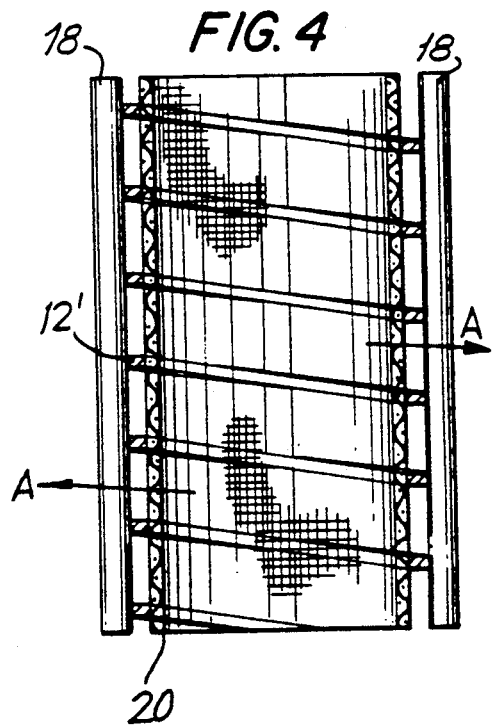
FIG. 4 shows a side-sectional view of the structure of FIG. 3.

In the embodiment of FIGS. 1 and 2 ring-shaped members 12 consists of discrete or closed hoops. In FIGS. 3 and 4 an alternate embodiment is shown in which the ring-shaped members are actually loops of a continuous, helical ribbon 12'.

Figure 5:
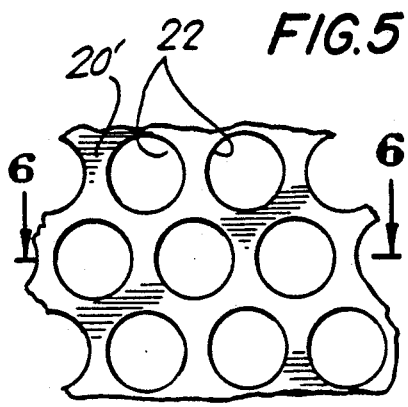
FIG. 5 shows an enlarged plan view of a preferred embodiment of the filter media for the structures of FIGS. 1-4.
Figure 6:
FIG. 6 shows an enlarged side sectional view of the filtering media of FIG. 5.

The filtering media 20 may consist of a woven or non-woven material of paper, fabric, or it may be a metal mesh, depending on the pressure and volume of fluid, and the size of the particulate matter that has to be intercepted. Alternatively, a filtering material may be made in the form of metallic sheet 20' having a plurality of openings 22 shown in FIGS. 5 and 6. This sheet may be made by the photolithographic methods used for generating electronic integrated circuits, whereby the openings can have dimensions smaller than a micrometer.

The structures shown in FIG. 1-4 and 7 are suitable for filtering particulate material from a fluid flowing radially outwardly. Because the ring-shaped elements 12 are generally flat so that they extend radially outward, they can withstand large tensile forces generated during filtering by the pressure differential in the fluid. The filtering media disposed inside the rings can be easily removed for cleaning or replacement. Furthermore, because of the open structure presented by the rings and the rods, only a small number of the interstices in the filtering media are blocked so that the filtering structure is very efficient as compared to the prior art structure.

Figure 8:
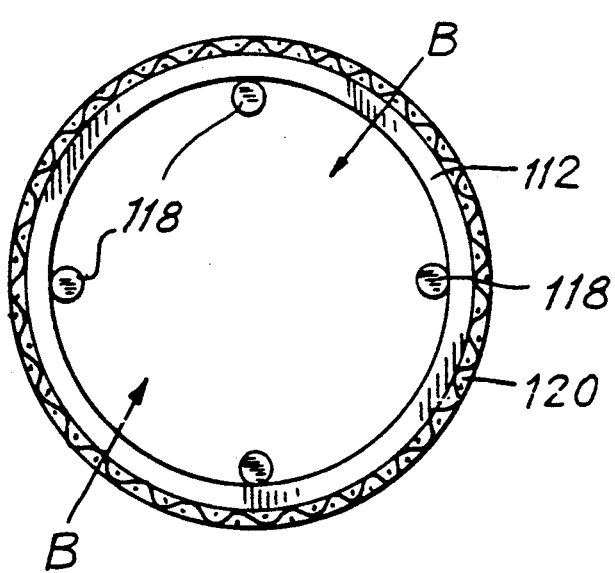
FIG. 8 shows a third embodiment of the invention.

FIG. 8 shows a filter structure for filtering a fluid flowing radially inwardly, as indicated by arrows B. In this structure, the filter media 120 is disposed radially outwardly of the ring-shaped elements 112. Similarly, rods 118 are radially inwardly of the ring-shaped elements 112. In this configuration, the filter structure resists large compressive forces generated by the pressure differential of the fluid.

Obviously other modifications may be made to the claims without departing from the scope of the invention as defined in the appended claims.

I claim:

1. A filter structure for removing particulate matter from a fluid flowing from a fluid path, comprising:
   a. a support element comprising a continuous helical coil formed of a plurality of winding defining a cylindrical space and formed of a substantially flat material extending radially away from said cylindrical space;
   b. spacing means coupled to said support element for maintaining said windings at preselected positions; and
   c. a non self supporting filtering media comprising a cylindrical surface disposed radially inwardly of said support element supported by said support element and positioned in the fluid path, said filtering media consisting of a flat sheet with a plurality of minute operations.

2. The filter structure of claim 1 wherein said filter structure is provided for filtering a fluid flowing radially inward of said cylindrical space with said filtering media comprising a cylindrical surface disposed radially outward of said support element.

3. The filter structure of claim 1 wherein said spacing means comprise a plurality of parallel rods.

4. The filter structure of claim 1 wherein said filtering media consists of a woven material.

5. A filter structure for removing particulate matter from a fluid flowing in a fluid path, comprising:
   a. a plurality of hoop shaped elements arranged to form a single open cylindrical space, said hoop-shaped elements being formed of a substantially flat material extending radially away from said cylindrical space;
   b. spacing means coupled to said hoop-shaped elements for maintaining said elements at preselected positions; and
   c. a non self supporting filtering media supported by said hoop-shaped elements in said fluid path, said filter structure being provided for filtering a fluid radially outward of said cylindrical space, with said filtering media comprising a cylindrical surface disposed radially inward of said hoop shaped elements, and said filtering media comprises a flat sheet with a plurality of minute openings.

6. The filter structure of claim 5 wherein filter structure is provided for filtering a fluid flowing radially inward of said cylindrical space, with said filtering media comprising a cylindrical surface disposed radially outward of said hoop-shaped elements.

7. The filter structure of claim 5 wherein said spacing means comprise a plurality of parallel rods.

8. The filter structure of claim 5 wherein said filtering means consists of a woven material.

9. The filter structure of claim 5 wherein said filtering means consists of a flat sheet with a plurality of minute openings.

10. A filter structure comprising:
    a. A plurality of flat hoop-shaped elements stacked in an axial configuration defining a single open cylindrical space;
    b. a plurality of rods coupled to said elements for maintaining said elements in preselected positions; and
    c. a non self-supporting filtering media supported by said elements being provided for filtering a fluid flowing radially outward of said cylindrical space and being disposed radially inwardly of said elements said filtering media comprising a cylindrical surface with minute openings.

11. The filter structure of claim 10 wherein said filtering media is disposed radially inward of said hoop-shaped elements.

12. The filter structure of claim 10 wherein said filtering media is disposed radially outward of said hoop-shaped elements.

13. The filter structure of claim 10 wherein said rods are disposed circumferentially around said hoop-shaped elements.

14. The filter structure of claim 13 wherein said rods are disposed radially inwardly of said hoop-shaped elements.

15. The filter structure of claim 14 wherein said rods are disposed radially outwardly of said hoop-shaped elements.

16. The filter structure of claim 10 wherein said rods extend through said ring-shaped elements, further comprising spacer means disposed between the hoop-shaped elements, and securing means for securing the spacers, the rods and the hoop-shaped elements.

17. The filter structure of claim 10 wherein said hoop-shaped elements are connected to form a continuous helical coil.

18. The filter structure of claim 10 wherein said filtering media consists of a woven material.

19. The filter structure of claim 10 wherein said filtering media consists of a flat sheet with a plurality of minute openings.

* * * * *